F. P. McCOLL.
APPARATUS FOR SOLDERING CANS.
APPLICATION FILED APR. 9, 1913.

1,204,170.

Patented Nov. 7, 1916.
2 SHEETS—SHEET 1.

Witnesses:
Harry S. Gaither
Ruth E. Zetterwall

Inventor
Francis P. McColl
by Chamberlin & Dreudenreich
Attys

F. P. McCOLL.
APPARATUS FOR SOLDERING CANS.
APPLICATION FILED APR. 9, 1913.
1,204,170.
Patented Nov. 7, 1916.
2 SHEETS—SHEET 2.
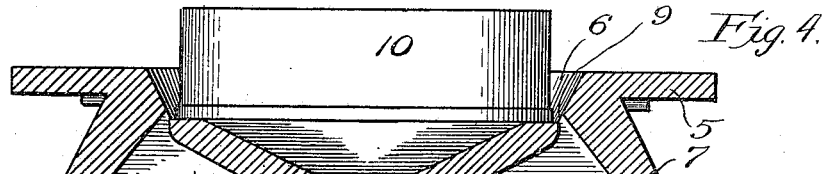
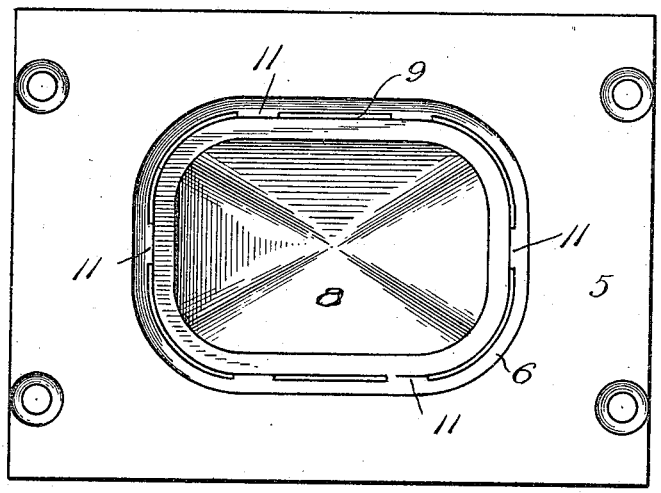
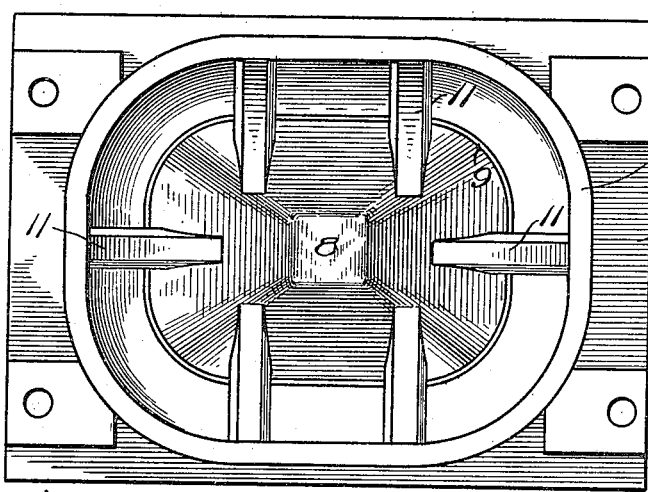

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

APPARATUS FOR SOLDERING CANS.

1,204,170.　　　　　Specification of Letters Patent.　　　Patented Nov. 7, 1916.

Application filed April 9, 1913.　Serial No. 760,079.

*To all whom it may concern:*

Be it known that I, FRANCIS P. McCOLL, a subject of the King of England, residing at St. Andrews, county of Charlotte, Province of New Brunswick, Dominion of Canada, have invented a certain new and useful Improvement in Apparatus for Soldering Cans, and declare the following to be a full, clear, and exact description of the same, such as will enable others skilled in the art to which it pertains to make and use the same, reference being had to the accompanying drawings, which form a part of this specification.

My invention relates to the art of soldering cans, particularly seams between the heads and the bodies of filled cans and has for its object to produce a simple and efficient apparatus, by means of which the joints between the heads and the bodies of cans, and especially filled cans, may be successfully soldered in a rapid and economical manner and without danger of discoloration of the cans or decorations thereon or of leaving air holes in the joints, and without danger of scorching the contents of the cans.

Figure 1:
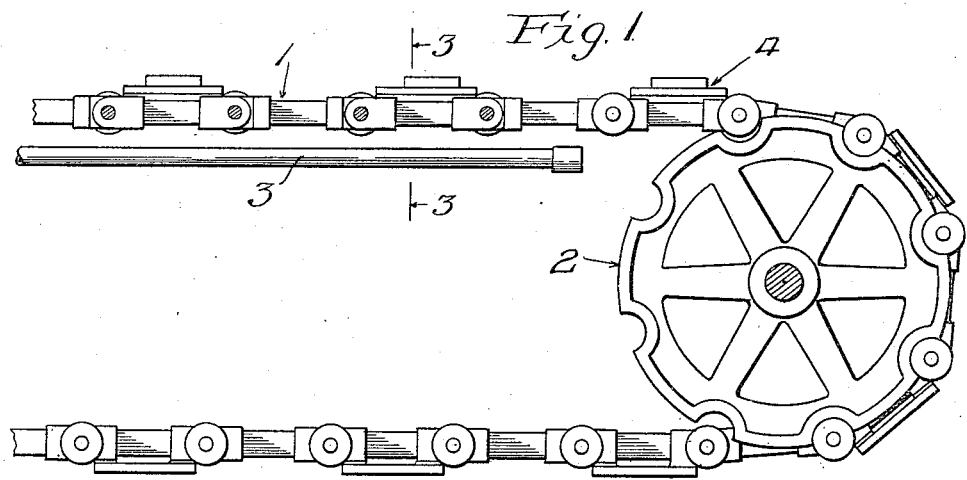
Figure 2:
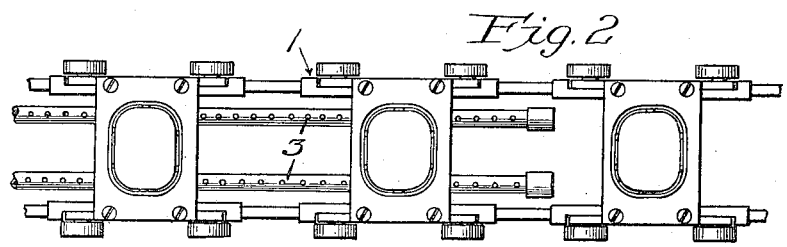
Figure 3:
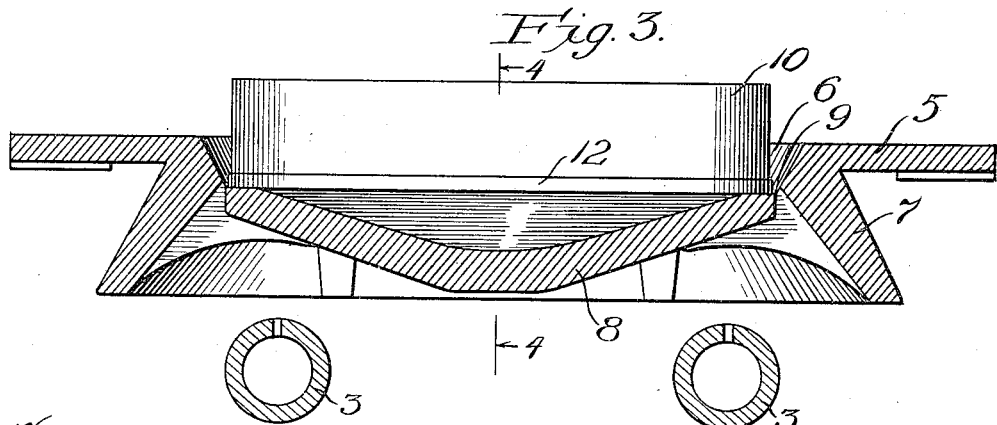

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a side view of a portion of a soldering machine arranged in accordance with my invention; Fig. 2 is a top plan view of the parts shown in Fig. 1; Fig. 3 is a section on line 3—3 of Fig. 1; Fig. 4 is a section on line 4—4 of Fig. 3; and Figs. 5 and 6 are respectively a top plan view and a bottom plan view of one of the can carriers.

In the accompanying drawings, I have illustrated a machine and apparatus adapted particularly for sealing double seam joints between the heads and the bodies of filled cans and, since the problems to be solved in soldering joints in filled cans bring in factors in addition to those encountered in operating on empty cans, the detailed description will be limited to this particular application of my invention; although it will of course be understood that the invention itself is not limited to filled cans or to any particular type of can.

Referring to the drawings, 1 represents a suitable endless conveyer traveling around sprocket wheels or pulleys of which one, 2, is shown. The sprocket wheels or pulleys revolve about horizontal axes so that one-half of the conveyer lies below the other half. Underneath the upper half of the conveyer are one or more burners 3, there being preferably two of these as shown. The burners are arranged parallel with the direction of travel of the conveyer and are extended lengthwise of the conveyer far enough to make it require three or four seconds for a point on the conveyer to travel from one end of the burners to the other. Carried by and distributed along the conveyer are a series of can carriers 4, into which cans to be soldered are set at one end of the apparatus, by which the cans are carried across the burners, and from which the cans drop by gravity at the opposite end of the apparatus. The conveyer is preferably made of two separated, parallel chains so as not to place any obstruction above the burners.

Each carrier, in the arrangement shown, consists of a flat plate 5, having an opening 6 cut through the center of the same shape as and slightly larger than the head of a can to be soldered. Surrounding this opening is a depending outwardly-flaring continuous deflector wall 7. The support for a can consists of a transverse table 8, lying within the space inclosed by the deflector wall and having its upper surface lying in a plane just below the upper edge of the inner inclined surface of the wall. Viewed from above the support is concave and viewed from below it is convex. The support conforms in shape to the head of a can be operated upon, is slightly smaller than the opening 6, and is so positioned in the opening as to leave a narrow passage 9 of uniform width between the edges of the support and the adjacent inclined surface of the deflector wall. The opening 6 is preferably made wider at the top than at the bottom where the support is located so that when a can 10 is placed in position in the carrier, the space around the same widens from the passage 9 toward the top of the carrier. The support may be held in place in any suitable way, preferably by means of a series of brackets 11 projecting inwardly from the deflector wall. For convenience and cheapness of manufacture, the entire carrier may be cast in a single piece, the members 5, 7, 8 and 11 being thus integrally connected together.

It will be seen that as the carriers travel above the burners the flames from the latter strike against the inner surface of the deflector wall and against the convex under surface of the support for the can so as to be spread out and deflected in a thin sheet through the passage 9 where they come in direct contact with the seam 12 between the head and the body of a can in the carrier. By properly adjusting the burners the flame will be confined to the joint or seam in the can while reaching all points thereof simultaneously, and therefore the body of the can or decorations on the body of the can will not be discolored by the heating operation. By making the opening 6 flaring, the hot gases are allowed to expand and pass up without being required to travel along the sides of the can. By making the support for the can concave as viewed from above, the entire head except along the seam or joint, is held out of contact with the hot metal and is protected against the hot metal by an air space of considerable depth. Consequently the head of the can and therefore the contents of the can are protected against the heat and no appreciable gas pressure will be produced in the can on account of a rise of temperature while the can is traveling over the burners. By properly proportioning the parts of the apparatus and properly adjusting the speed at which the cans are carried over the burners, each seam to be sealed may be subjected to an intense heat applied simultaneously and uniformly throughout the entire length of the same for a period sufficient to make the solder in the joint fluid and give it an opportunity to form a continuous perfect seal.

As far as I am aware it has heretofore been impossible successfully to solder joints in a completely closed filled can because the methods employed for applying heat to the joint have been such as to heat the contents of the can sufficiently to produce in the can a high pressure which serves to blow the solder out of the joint and leave air holes in the same; a common expedient being to puncture the can so as to permit the pressure to be relieved without having the contents blow out through the joint. In accordance with my method of applying a fluid heating medium such as a flame directly to the joint itself and confining it to the joint and making the application simultaneous at all points along the joint, the members of the joint are quickly heated and the solder melted before the body of the can and its contents are appreciably heated and consequently there will be no appreciable rise of pressure within the can. Incidental advantages are the speed at which the soldering operation is performed and consequently the reduction in cost due to saving of fuel, time and labor, all of which are important items in canning industries.

Double-seam joints between the heads and the bodies of filled cans have been sealed with great success in accordance with my invention, the solder being placed between the heads of which the joints are formed, and the soldering being done while the cans are inverted, bringing the first bend in each joint on the under side. When the solder is melted it settles down into this first bend, that is in that portion of the joint next to the head and the can body where it serves to the best advantage as a sealing medium and where, because of the strength of the joint throughout this portion, the seal is not apt to become broken during subsequent handling of the can. Furthermore, by properly proportioning the amount of solder, there will be an air space left in the joint above the melted solder which will permit gases to pass out of the can in case the can should become accidentally heated, without blowing any of the solder out of the joint and without danger of leaving air holes because the melted solder will always find its own level as long as it remains liquid and will immediately close up a gap which may happen to be formed by the escaping gases. Furthermore all danger of scorching the contents of filled cans is avoided.

I claim:

1. In a soldering machine, one or more elongated burners, a carrier for a can to be soldered having an imperforate bottom portion surrounded by a seat for supporting the can, and a narrow annular passage extending through the same around the seat, said passage being of substantially the same size and shape as the end of a can to be soldered, means for moving said carrier along the burner or burners above and in proximity to the same, and means on the under side of the carrier for deflecting the flame in a continuous annular sheet through said passage.

2. A soldering machine comprising a burner, a can carrier having a concave imperforate seat for a can and having a narrow annular passage surrounding said seat, said passage extending through the carrier and being substantially the same shape as and a little larger than the end of a can to be soldered, deflecting means on the under side of the carrier for deflecting a flame beneath the carrier in a continuous sheet throughout the entire length of said passage, and means for uninterruptedly moving said carrier over the burner and in proximity thereto.

3. In a soldering machine, an elongated burner, a can carrier having a concave seat for supporting a can to be soldered, said carrier having a narrow annular passage extending through the same around said seat, said passage being of substantially the same shape as and a little larger than the end of the can to be soldered, deflecting means on the under side of the carrier for deflecting flame and hot gases into said passage in the form of a continuous sheet extending throughout the length of said passage, and means for moving said carrier lengthwise of the burner and above and in proximity thereto.

4. In a soldering machine, one or more elongated burners, a carrier for a can to be soldered having a concave seat for supporting the can and a narrow annular passage extending through the same around the seat, said passage being of substantially the same shape as and a little larger than the end of a can to be soldered, means for moving said carrier along the burner or burners above and in proximity to the same, and means on the under side of the carrier for deflecting the flame in a continuous annular sheet throughout the length of said passage.

In testimony whereof, I sign this specification in the presence of two witnesses.

FRANCIS P. McCOLL.

Witnesses:
W. F. LYNCH,
M. A. HETHERINGTON.

Copies of this patent may be obtained for five cents each, by addressing the "Commissioner of Patents, Washington, D. C."